Feb. 5, 1935. J. W. PETERSON Re. 19,452
COTTER KEY
Original Filed Jan. 29, 1932
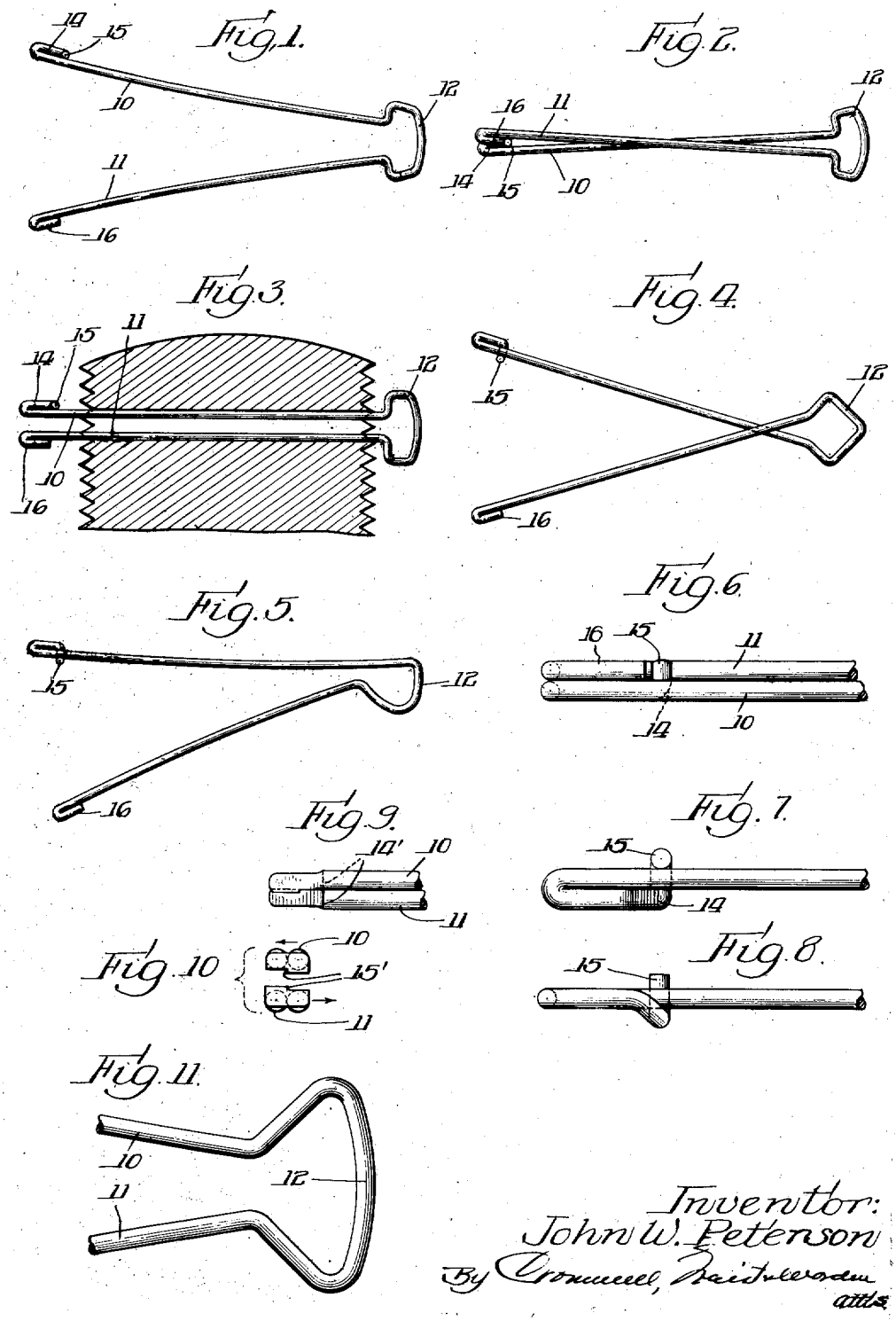
Inventor:
John W. Peterson
By Cromwell, Faithfull & Cromwell
Attys.

Reissued Feb. 5, 1935

Re. 19,452

UNITED STATES PATENT OFFICE 19,452

COTTER KEY

John W. Peterson, Cairo, Ill.

Original No. 1,903,129, dated March 28, 1933, Serial No. 589,576, January 29, 1932. Application for reissue June 25, 1934, Serial No. 732,379

14 Claims. (Cl. 85—8.5)

This invention relates to improvements in cotter keys or cotter pins of the general type having two legs for insertion through a bore or opening of a bolt, nut, shaft, or other machine element, for the purpose of retaining parts in assembled relationship.

A general object of the invention is the provision of such a cotter key which will perform its intended function effectively, and which can be inserted and securely fastened in place, and which requires, in its use, much less time and labor for the assembling and securing of it in place than is involved in the use of cotter keys heretofore generally employed.

Another object is the provision of a cotter key of the sort described which may be easily and freely inserted through an opening of appropriate size, and which automatically locks itself against withdrawal, yet may be withdrawn with facility upon proper manipulation.

Another object is the provision of a cotter key which, by virtue of its automatic locking characteristic, is particularly qualified for assembly in locations affording limited or restricted working space.

Yet another object is the provision of a cotter key possessing the attributes indicated above, which may be manufactured economically and in quantities with uniformity in dimensions and design, and which also may be made in a great variety of sizes.

Other and further objects will be pointed out or indicated hereinafter, or will be apparent to one skilled in the art upon an understanding of the invention or its employment in use.

For the purpose of aiding in the explanation of the invention, I show in the accompanying drawing forming a part of this specification, various forms and features of cotter keys in which the invention is embodied, but it is to be understood that these and the following description are presented merely by way of example and illustration, and are not to be accorded any interpretation calculated to limit the appended claims short of the true and most comprehensive scope of the invention in the art, as I am aware that it may be embodied in many other specific forms, and that the features herein illustrated and described may be modified in various particulars without departing from the spirit of the invention or the intended scope of the claims.

In said drawing,

Fig. 1 is an illustration of one form of my improved cotter key with its portions in positions which they assume under normal or unrestrained condition of the metal;

Fig. 2 is an illustration of the same form of key with parts retained in a tensioned condition and in positions in which they are retained preliminary to and incident to insertion through the intended key seat or aperture;

Fig. 3 is an illustration of the same form of key in its seated and secured relationship with a bolt, shaft, or the like;

Fig. 4 is an illustration of a modified form of key embodying the invention, with the parts in normal or untensioned positions;

Fig. 5 is an illustration of a second modified form of key embodying the invention, with its parts in the normal or untensioned position;

Fig. 6 is a detail, in the nature of a side elevation of the left end portion of Fig. 2, and serves to illustrate one form of latching means and the relationship of parts in the latched condition;

Fig. 7 illustrates another form of latching or holding element, the figure being a detail of the end of a pin leg;

Fig. 8 is another view of the same, looking at the bottom of Fig. 7;

Fig. 9 is a detail similar to Fig. 6, showing a second modified form of latching or holding members;

Fig. 10 is in the nature of a left end view of Fig. 9, but with the latching or holding members separated; and Fig. 11 is an illustration of a further modified form of the bight or loop of the key.

Described generally, the invention contemplates a cotter key or pin having two arms or legs connected by a bight, head or loop, and of such nature that when unrestrained, the legs tend to assume a spread or separated relationship, considerably exceeding in their span the diameter of the seat or aperture in which the key is to be inserted and secured. The legs of the key, or their connecting bight or head, or both, are of a resilient or elastic character, permitting the legs to be pressed together into close association with each other, and at the end of one or both of the legs is provided a latching or holding element, whereby the legs may be retained in that relationship against the tension which tends to move them to the separated or spread position. This latching or holding arrangement is such that the ends of the legs may be very easily and quickly freed from this retention, to allow them to spring apart under the inherent elasticity or resiliency of the device. At the end of one or both of the legs is provided a stop or abutment member which projects outwardly from the leg in a position to engage against a surface of the element in which the key is seated, for the purpose of preventing withdrawal of the key from the seat. The head or bight of the key serves in similar fashion to prevent withdrawal of the key from the seat in the opposite direction.

A more detailed understanding of the invention may be had from the illustrative embodiments shown in the drawing. In Fig. 1 is illustrated a key formed of wire, which may be of any appropriate cross-sectional form, the key being shaped with the legs 10 and 11 connected by a loop or bight 12, the wire being of a tempered or resilient character such that the legs tend strongly to assume the spread or relative positions approximately as shown. At the free end of the leg 10 the wire is bent reversely back along the outer side of the leg to form an abutment or stop member 14, the tip of which is bent upwardly to a position somewhat above the leg wire 10, to form a latching or retaining member 15. The parts are illustrated on a somewhat larger scale in Fig. 6. The wire at the free end of the leg 11 is bent reversely back along the outer side of the leg wire, for a length somewhat less than that of the reversed portion 14, and this portion 16 is adapted to constitute an abutment or stop member. The provision of this member 16, while desirable, is optional, but not essential.

The key may be shaped from wire having the proper resiliency, or the wire may be shaped while in a mild or annealed condition, to form the key above described, and then tempered, to give it the desired set and spring quality.

The device having the proper spring quality, the wire is placed under tension by pressing the legs together and crossing or partly crossing one over the other, as in the positions illustrated in Fig. 2, and the key is latched in this tensioned condition by engaging the leg 11 against the outer side of the latching or retaining member 15, the parts being held in this relationship by the spring tension of the wire. The key is now in condition suitable for insertion through the intended key seat or aperture. This contracting or tensioning and latching of the key may be done as a part of its manufacture, in which case, the key is marketed in that condition.

In this contracted or latched condition, the legs are close together, and may be quickly and easily inserted through a suitable key seat or aperture to a distance such that the latched ends of the legs protrude. Thereupon, the key may be quickly and easily set or secured simply by disengaging the leg 11 from the latching member 15, which may be accomplished readily by the insertion of a prying implement between the ends of the legs. Immediately the leg 11 is disengaged from the latching member, the legs spring apart under the tension of the material, to the extent permitted by the key seat or aperture, thus assuming a position as illustrated for example in Fig. 3. The elastic tension of the material holds the legs in contact with the opposite wall portions of the key seat, and the key is retained against withdrawal by abutment of the abutment or stop member or members against the adjacent side of the transfixed member. The continuous spring pressure of the key legs on the wall portions of the seat holds the key against rattling. The key may thus be inserted in close proximity to washers or other elements mounted on the transfixed member, or through collars, castellated nuts, or other members provided with suitable apertures or keyways in register with the key seat.

The bight, loop, or head of the key may be made in any of a great variety of forms, certain variations in this particular being illustrated in Figs. 4, 5 and 11.

The latching member and stop members may be formed in various fashions. For example, in Figs. 4, 5, 7 and 8 is illustrated an arrangement wherein the latching member 15 is provided by looping the reversely bent end of the leg wire under the latter and turning the tip up at the inside of the leg wire. In Figs. 9 and 10 is illustrated another fashion in which cooperating latching members may be formed at the ends of the leg wires, by bending the ends of the wires reversely alongside the leg wires and then swaging the bent portion to form complementary shoulders or offsets 15′ adapted to engage each other to hold the legs under tension. In Fig. 10 the arrows indicate the direction of the spring tendency of the leg members. In this form, as in the others, the reversely bent ends of the leg wires form stop members, as indicated at 14′.

The temper set of the material may be such as to cause the legs to spread or separate in crossed relationship, as illustrated for example in Fig. 4, although with this form there is not the opportunity for as much bearing contact between the legs of the key and the wall surfaces of the key seat as there is with the other forms illustrated.

It will be observed that the use of a cotter key containing the characterizing features of the present invention greatly diminishes the time required for the insertion and setting or locking of the key, from that necessary in the setting of a key which has to be spread at the ends; and it is to be observed likewise that the proper setting of the key is effected with certainty. While spring keys have been heretofore proposed for use, it has been difficult to accomplish their insertion, due to the fact that the legs had to be held together by pliers or the like in order to effect their introduction into the aperture. This disadvantage is entirely eliminated by my present invention, as the legs are held together by the latching arrangement. Hence the pin may be handled entirely by the head or bight. This facility of insertion and locking is of particular advantage where the working space is restricted or the key seat is close to washers, collars, or the like. The key may be as readily removed, by latching the ends of the legs as above described, so it may be withdrawn by the head, or as is the usual practice, by cutting off the head, or ends of the legs, and then withdrawing it. The leg members may be serrated, knurled or sinuously formed for the purpose of increasing their bite or holding effect upon the wall portions of the key seat.

What I claim is:

1. A cotter key comprising a pair of legs conjoined by a head and tending normally to assume a spread relationship, said key formed to permit the end portions of the legs to be overlapped one upon the other, a latching member carried adjacent the end of one leg for latching engagement with the other leg to hold the legs close together and under elastic tension in positions such that the over-all width of the key across the ends of the legs is less than that of the head, and a stop member projecting outwardly from one of the legs adjacent the free end thereof.

2. A cotter key comprising a pair of legs conjoined by a head and tending normally to assume a spread relationship, said key formed to permit the end portions of the legs to be overlapped one upon the other, latching members carried adjacent the ends of the legs and adapted for interengagement when end portions of the legs are in overlapped position to hold the legs close together and under elastic tension in positions wherein the maximum distance across the legs is less than the maximum width of the head, and a stop member projecting outwardly from one of the legs adjacent the free end thereof.

3. A cotter key comprising a pair of legs conjoined by a head and tending normally to assume a spread relationship, said key formed to permit the end portions of the legs to be overlapped one upon the other, a latching member carried adjacent the end of one leg for latching engagement with the other leg to hold the legs under elastic tension in positions relatively close together, and stop members carried on the legs adjacent the ends thereof and projecting outwardly therefrom in the directions in which the legs tend to separate.

4. A cotter key as specified in claim 2 which, inclusive of the latching members, is formed throughout of a single length of spring wire.

5. A cotter key as specified in claim 1 and wherein the latching member projects from the leg in one direction and the stop member projects in another direction.

6. A cotter key as specified in claim 2 and wherein the latching members are formed as oppositely directed projections on the leg portions.

7. A cotter key comprising a pair of legs conjoined by a head and tending normally to assume a spread relationship, said key formed to permit the end portions of the legs to be overlapped one upon the other, a latching member carried adjacent the end of one leg for latching engagement with the other leg to hold the legs under elastic tension in positions relatively close together, and stop members projecting outwardly in opposite directions adjacent the free ends of the legs, the stop member on one leg being spaced a less distance from the head than the stop member on the other leg.

8. A cotter key formed of spring wire with two leg portions tending to assume a spread and separated relationship, the wire at one end of a leg member being bent reversely to a position along the outer side of said leg member and part of the reversely bent portion being off-set to form a catch engageable by the other leg member, whereby the leg members may be latched in proximate relationship and held under elastic tension.

9. A cotter key having two legs connected by a head and elastically constrained toward spread relationship, a latching member carried by one of the legs and adapted for latching cooperation with the other leg to retain the legs under elastic tension with their ends relatively close together, and a stop member carried adjacent the end of one leg and projecting outwardly therefrom on the side opposite the other leg, said latching and stop members being insertable through the key-way with the legs when the latter are latched together.

10. A cotter key having two connected legs elastically constrained toward a spread position, one of the legs being formed adjacent its free end with a stop member extending outwardly in the direction away from the other leg and one of the legs being formed adjacent its free end with a latching member for latching engagement with an end portion of the other leg.

11. A cotter key having two leg portions elastically constrained toward spread relationship and movable to a crossed relationship, and a latching member carried on one of the leg portions for latching the leg portions in crossed relationship under elastic tension with their ends close together.

12. A cotter key having two leg portions connected by a head portion and tending normally to assume a separated relationship at their free ends, said leg portions having stop members projecting therefrom adjacent their free ends and having also interengageable parts whereby they may be hooked together under elastic tension to hold the outer sides of their free ends and stop members closer together than the outer sides of the head, for insertion through the key seat.

13. A cotter key having two leg portions connected by a head portion and tending normally to assume a separated relationship at their free ends and adapted to have their free ends moved into overlapping relationship under elastic tension, said leg portions having stop members projecting therefrom adjacent their free ends and having also interengageable parts whereby they may be hooked together under elastic tension to hold their free ends and stop members sufficiently close together to permit their insertion through a key seat which will not admit the head.

14. A cotter key comprising a pair of legs conjoined by a head and tending normally to assume a spread relationship, one of the leg portions having a part projecting laterally in a direction away from the other leg to form a stop member adapted for latching engagement with a part of the other leg to hold the legs under elastic tension in positions wherein the maximum distance across the legs and stop member is less than the maximum width of the head.

J. W. PETERSON.